April 23, 1940.　　　C. H. COOLEY ET AL　　　2,198,152
DISPENSING MECHANISM OF POPPED CORN INTO CANDY FLOSS OR THE LIKE
Filed June 17, 1939　　　3 Sheets-Sheet 1
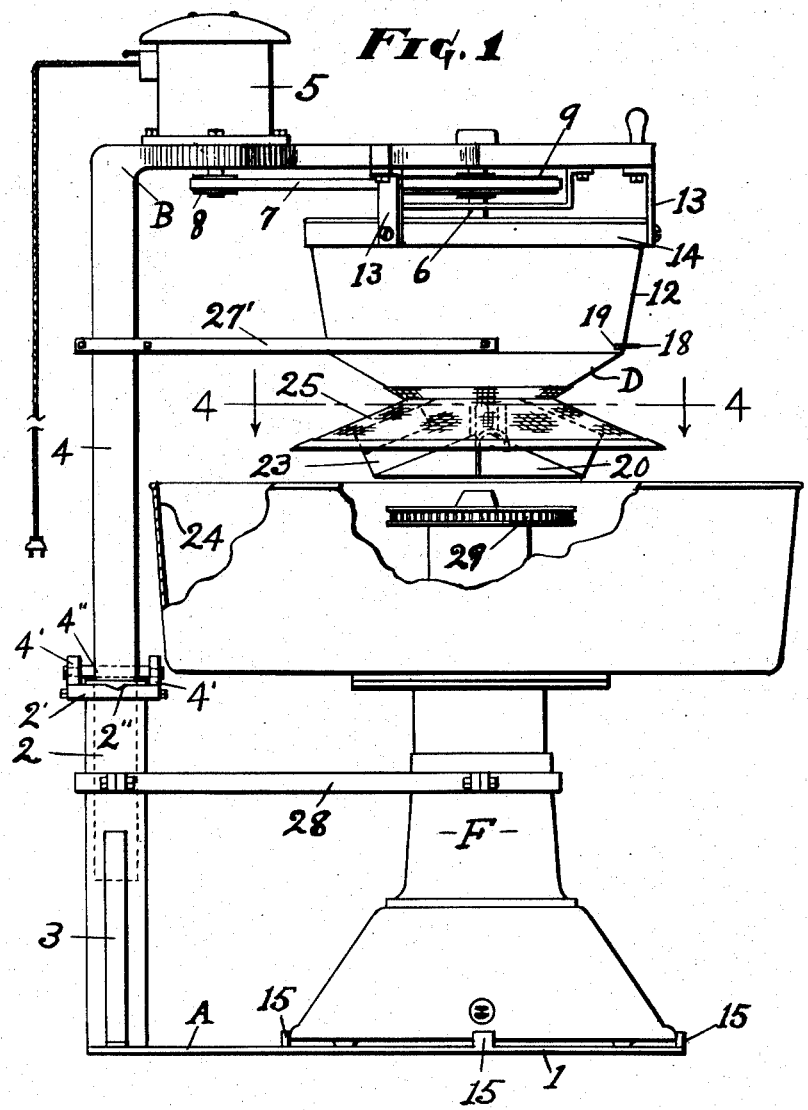
INVENTORS
CHARLES H. COOLEY
REGINALD B. SMITH
BY *U.S. Charles*
ATTORNEY.

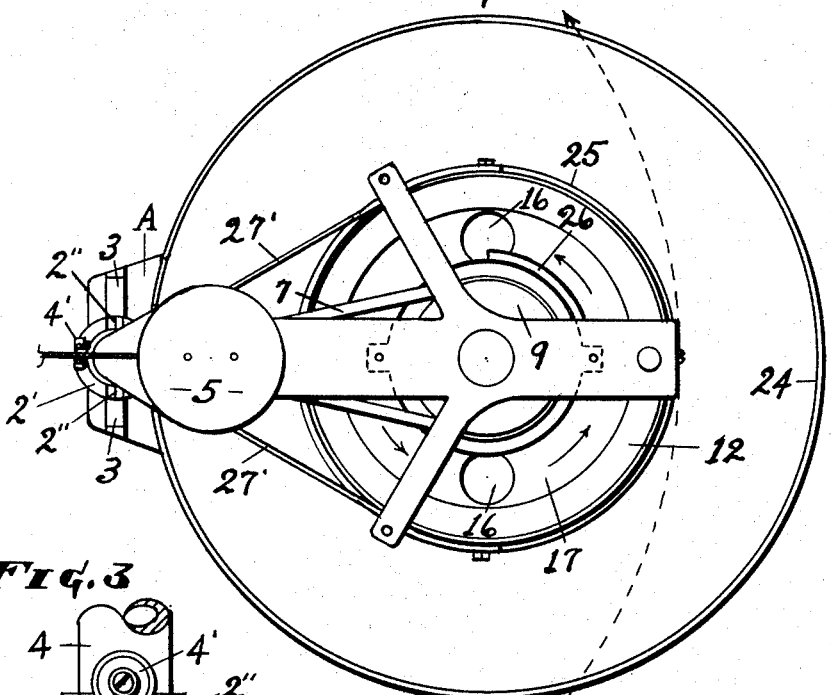
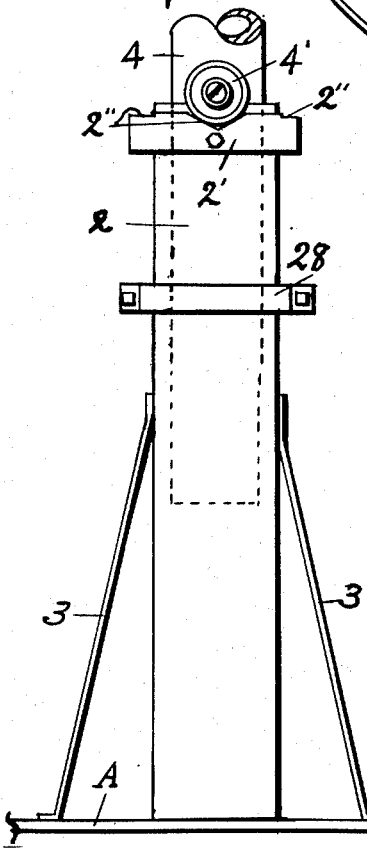
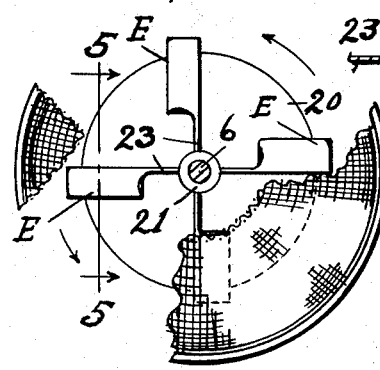
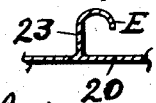

April 23, 1940.  C. H. COOLEY ET AL  2,198,152
DISPENSING MECHANISM OF POPPED CORN INTO CANDY FLOSS OR THE LIKE
Filed June 17, 1939  3 Sheets-Sheet 3
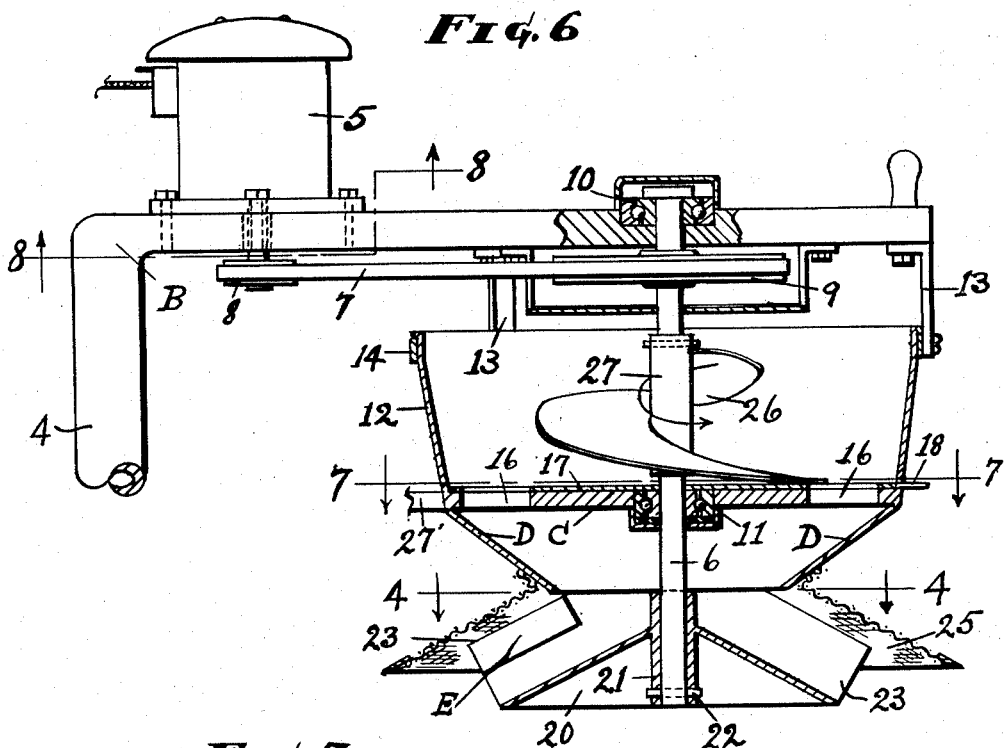
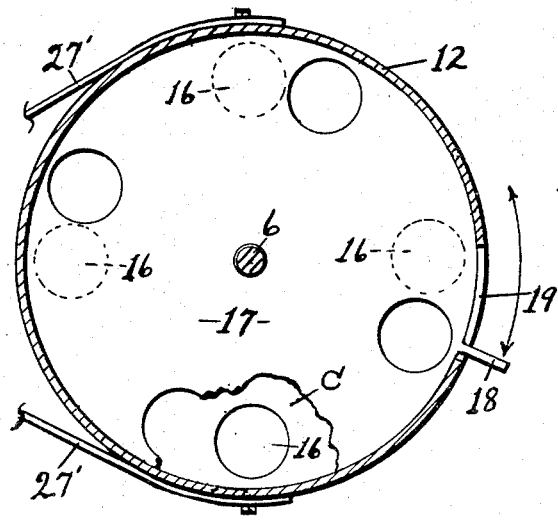
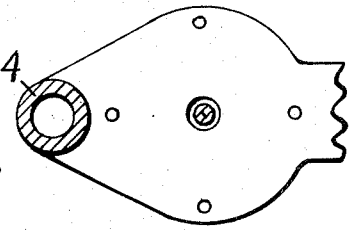
INVENTORS
CHARLES H. COOLEY
REGINALD B. SMITH
BY U. G. Charles
ATTORNEY.

Patented Apr. 23, 1940

2,198,152

UNITED STATES PATENT OFFICE 2,198,152

DISPENSING MECHANISM OF POPPED CORN INTO CANDY FLOSS OR THE LIKE

Charles H. Cooley and Reginald B. Smith, Wichita, Kans.

Application June 17, 1939, Serial No. 279,726

4 Claims. (Cl. 107—4)

Our invention relates to a dispensing mechanism of popped corn into candy floss or the like and has for its principal object to produce a confection by combining the candy floss and popped corn as they leave their respective source of supply.

A further object of our invention is to provide a mechanism to which a candy floss machine may be connected in such a way that popped corn dispensed from the mechanism will enter the floss along its path from the ejecting head of said floss machine to the wall of a pan carried by the floss machine and upon which the substance of floss and popped corn will contact simultaneously as mixing means for the substance.

A still further object of our invention is to provide means whereby the popped corn vender may be disengaged for continuous operation of the floss machine, by which means popped corn may be eliminated from the floss.

These and other objects will hereinafter be more fully explained, reference being had to the accompanying drawings forming a part of this specification, and in which like characters will apply to like parts in the different views.

Referring to the drawings:

Fig. 1 is a side view of our mechanism and a floss machine as connected, parts removed for convenience of illustration.

Fig. 2 is a plan view of Fig. 1.

Fig. 3 is an enlarged rear view of the supporting legs of the mechanism.

Fig. 4 is a sectional view taken on line 4—4 in Figs. 1 and 6 looking in the direction of the arrows, parts removed for convenience of illustration.

Fig. 5 is a sectional view taken on line 5—5 in Fig. 4.

Fig. 6 is an enlarged sectional view of the popped corn container and fragmentary portion of its supporting arm and motor carried by the arm.

Fig. 7 is a sectional view taken on line 7—7 in Fig. 6 looking in the direction of the arrows.

Fig. 8 is an inverted view of the arm at the location of the motor taken on line 8—8 in Fig. 6.

Our invention herein disclosed consists of a base plate 1, having an outward peripheral extension A upon which a sleeve 2 of a standard is secured and braced by a pair of members 3 oppositely extending from the sleeve, the upper ends of said brace members being attached to the sleeve, while their lower ends are secured to the said extension of plate 1. Positioned in the said sleeve is a vertically disposed portion of an arm 4, said portion adapted to turn or slide longitudinally in the sleeve with a smooth moving fit. The said sleeve has a track 2' secured thereto and being spaced a short distance downward from the upper end thereof, and having four depressions 2" equally spaced therearound, the arm being carried by a pair of rollers 4' oppositely positioned and trunnioned on a spindle 4" that extends through said arm, said rollers to engage on said track as the arm is turned, seating in the depressions at intervals spaced therearound for the purpose later described.

The arm above referred to has a right angle bend as at B to provide a horizontally disposed portion, upon which is seated an electric motor 5 as power actuating means to turn a shaft 6 through the medium of a belt 7 engaging on pulleys 8 and 9, the latter named pulley being secured to said shaft 6, and the said shaft being trunnioned in bearings 10 and 11, bearing 10 being secured in the horizontal portion of the arm, while bearing 11 is axially secured in the bottom C of hopper 12, said hopper being carried by a plurality of hangers 13, spaced therearound, it being understood that the upper rim of the hopper is reinforced by an annular band 14 to which one end of each hanger is attached, the other ends thereof being secured to the horizontally arranged portion of said arm, as shown in Figs. 1 and 2, by which means the said hopper is supported in axial alignment with a candy floss machine that is seated on said plate 1, and being axially secured thereon by upwardly extending ears 15 spaced around the peripheral edge of said plate and integrally joined thereto; the candy floss machine serving as an anchor to maintain an upright position of the mechanism and in working relation to each other.

The hopper above referred to is a container for popped corn, and has means in the bottom thereof consisting of a plurality of apertures 16, through which the popped corn will pass, said apertures being adjacent the said wall of the hopper, spaced apart and from said wall. To control the flow of the popped corn through the apertures, is through the medium of a coacting apertured disc 17, seated on the inner side of the hopper bottom, and being approximately the same in diameter and adapted to turn on shaft 6 to vary the size of the outlet as the coacting apertures are moved selectively toward or from registry. To turn the disc, there is a handle 18 radially extending therefrom and outward through a slot 19 through the wall of the hopper as means to turn the disc to accomplish a desired flow of the popped corn.

The wall of the hopper extending downward from its bottom as at D is conical in form, the lower end thereof being open, said wall portion to function as a funnel, conducting the popped corn at or near the center of a revolving distributor, that is secured to and turned by shaft 6, said distributor consisting of a conical member 20, having a hub 21, through which said shaft 6 extends, and being secured thereon by pin 22 extending through the lower end thereof, as shown in Fig. 6. Radially secured to the upper side of said conical member is a plurality of deflectors 23, each of which is arced at the upper portion thereof, as at E. The said arcs longitudinally terminate a short distance from the hub 21, by which means the popped corn as it falls on the conical member is thrown by centrifugal force toward the wall of the candy floss machine pan 24, the arc of the deflector being means to direct the corn obliquely downward and outward, while other grains of popped corn not controlled by the deflectors will be thrown in contact with a screen element 25, which likewise directs a downward flow of the portion of popped corn just referred to. It will be understood that the said screen element is stationarily carried and secured to the funnel adjacent its opening.

To avoid bridging of the popped corn in the hopper, we have arranged an auger 26, wound about a hub 27, through which said shaft 6 extends, and being secured thereto as turning means for the auger which repeatedly lifts the center portion of the corn in the hopper which will in turn pass through the said openings 16.

To avoid excess vibration of the distributor, there is positioned brace elements 27', the legs of which tangentially extend from the wall of the hopper, and being secured to said arm 4 as shown in Fig. 1; furthermore, the mechanism is braced to the neck F of the floss machine by an anchor 28, secured thereto, and to the sleeve of the standard, as shown in Fig. 1; the said anchor, being removably attached, is means to separate the floss machine from the mechanism.

The operation of the mechanism is to discharge the popped corn simultaneously through a flow of candy floss that is radially discharged from a head 29 of the floss machine, that rotates at a high velocity, depositing the floss on the inner wall of the pan, by which arrangement the floss and the popped corn are mixed as a confection for the market. In other words, the mechanism is arranged to work in conjunction with a standard make of candy floss machines, and whereby the ingredient from each is combined as an edible; furthermore, by closing the openings or flow of the popped corn, the mechanism may be turned in either direction as indicated by the arrows in Fig. 2, and retained at an angle of ninety degrees or through a turn of one hundred eighty degrees, in which positions the floss machine may be operated independent of the mechanism. The rollers engaging in their respective depressions, as heretofore described, is the means to stationarily retain the hopper at the points desired, and especially when in working relation to the floss machine head.

While we have shown a vertically disposed motor as turning means for the auger and distributor, we do not wish to be restricted to such motor position, as the motor may be horizontally disposed and applied with modified means to connect the same to said shaft 6, and such other modification may be employed as lie within the scope of the appended claims.

Having fully described my invention what we claim as new and desire to secured by Letters Patent is:

1. In combination with a candy floss machine, a mechanism comprising a popped corn container, a rotatable distributor to receive popped corn from the said container, means to control the flow of the popped corn from the container into the distributor and power actuated means to rotate the distributor to eject the corn by centrifugal force while the candy floss machine is ejecting floss, the floss and popcorn moving in substantially the same path as they leave their respective source of ejection to mix the corn and floss together.

2. In combination with a candy floss machine, a mechanism comprising a base plate on which said candy floss machine is seated, a standard secured to said plate, the standard comprising a sleeve element and an arm rockably carried by the sleeve, a hopper carried by the arm, a shaft trunnioned on the arm and hopper and being turned by a motor, an auger positioned in the hopper secured to the shaft and being turned thereby, and a distributing element secured to the shaft and rotatable therewith, said shaft axially aligned with the said candy floss machine.

3. In combination with a candy floss machine, a mechanism comprising a plate on which the floss machine is seated, and means to secure the machine concentrically on the plate, the plate having an extension outward from its peripheral edge, a sleeve vertically positioned and seated on the plate extension, an annular track secured to the upper end of the sleeve a short distance downward from its end, the track being depressed at intervals around its upper face, an arm telescopically engaging with the sleeve, rollers carried by the arm and adapted to engage the track as carrying means for the arm, said rollers seating in their respective depressions when the arm is turned, functioning as detents to retain the arm in a predetermined position as turned, said arm having a right angle bend intermediate its ends, said right angle bent portion being horizontally disposed, a hopper for popped corn, a vertically disposed shaft carried by the said right angle bent portion, said arm being adapted to carry a motor, means to connect the motor with the shaft to turn the same, an auger positioned in the hopper, secured to and rotatable with the shaft, a disc positioned in the bottom of the hopper, said disc and bottom being apertured in registry, means to turn the disc to close and open the apertures partially or entirely, a distributor secured to the shaft at its lower extremity, the distributor being in working relation to the hopper to receive and dispense the popped corn dropping thereon from the hopper, the floss machine having a floss dispensing head axially aligned with the distributor, whereby the popped corn and floss are intermixed when they leave their respective source of ejection.

4. A mechanism of the class described, comprising a standard and means to support the standard vertically, the standard being jointed, whereby its upper portion is carried by the lower portion in such a way as to permit turning of the upper portion in either direction, and means to automatically detain the same at a selected position thereon, a hopper secured to the upper portion and rockable therewith, said hopper functioning as a container for popped corn, a shaft rotatably carried by said upper portion and hopper, power actuated means to turn the shaft, means on the shaft to agitate the popped corn in the hopper, said shaft extending through and beneath the hopper, a distributor secured to the lower end of the shaft and rotatable therewith, means in the bottom of the hopper to dispense popped corn upon the distributor, and means on the distributor to centrifugally dispense the popped corn therefrom, said first means adapted to receive a candy floss machine seated thereon, the floss machine being axially aligned with said shaft and elements associated therewith, the floss machine and distributor coacting to intermix the popped corn and floss simultaneously, all as and for the purpose specified.

CHARLES H. COOLEY.
REGINALD B. SMITH.